(12) United States Patent
Kashiwagi

(10) Patent No.: US 7,623,720 B2
(45) Date of Patent: Nov. 24, 2009

(54) IMAGE PROCESSING APPARATUS AND METHOD

(75) Inventor: Susumu Kashiwagi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 571 days.

(21) Appl. No.: 11/295,563

(22) Filed: Dec. 7, 2005

(65) Prior Publication Data

US 2007/0031048 A1 Feb. 8, 2007

(30) Foreign Application Priority Data

Aug. 3, 2005 (JP) ............................. 2005-225612

(51) Int. Cl.
*G06K 9/46* (2006.01)
*H04N 7/12* (2006.01)

(52) U.S. Cl. ..................... 382/239; 375/240.2; 382/250

(58) Field of Classification Search ................ 382/166, 382/232, 239, 245, 246, 250, 251, 258; 375/240.03, 375/240.2, 240.23, 240.02, E7.139, E7.159, 375/E7.176, E7.226; 358/539
See application file for complete search history.

(56) References Cited

U.S. PATENT DOCUMENTS 4,519,085 A * 5/1985 Catros ........................ 375/245
6,052,488 A * 4/2000 Takahashi et al. ........... 382/239
6,144,763 A * 11/2000 Ito .............................. 382/166
6,233,359 B1* 5/2001 Ratnakar et al. ............ 382/250
6,643,402 B1* 11/2003 Okada ........................ 382/232
7,151,856 B2* 12/2006 Uchibayashi et al. ....... 382/236

FOREIGN PATENT DOCUMENTS

| JP | 2000-307879 A | 11/2000 |
| JP | 2002-300406 A | 10/2002 |
| JP | 2003-304402 A | 10/2003 |

* cited by examiner

*Primary Examiner*—Kanji Patel
(74) *Attorney, Agent, or Firm*—Fujitsu Patent Center

(57) ABSTRACT

An image processing apparatus capable of controlling the amount of codes in the image data of one image through one-pass encoding, without changing a quantization table. A Discrete Cosine Transformation (DCT) unit performs discrete cosine transformation on each MCU of the image data of the image. A quantizer quantizes DCT coefficients resulted from the discrete cosine transformation, using the quantization table. A code amount controller sets a threshold value for each MCU based on a target amount of codes for one image and the amount of codes usable for the unprocessed MCUs, reduces the quantized DCT coefficients based on the threshold value, in order to adjust the amount of codes to be generated in the MCU.

12 Claims, 9 Drawing Sheets

| 107 | 44  | 15  | -4  | 69  | -10 | 21  | -36 |
|-----|-----|-----|-----|-----|-----|-----|-----|
| -50 | 43  | 54  | -21 | 39  | 99  | -15 | -11 |
| -39 | 13  | 35  | 91  | -18 | -43 | 23  | 67  |
| 13  | 21  | 133 | -23 | -24 | 0   | -19 | -15 |
| -72 | -15 | -81 | 12  | 39  | 25  | -48 | -21 |
| -36 | -27 | 2   | 79  | -61 | 55  | -30 | -11 |
| -13 | 24  | 55  | -43 | 110 | -86 | -7  | -81 |
| -14 | -89 | 21  | 16  | 16  | 50  | -34 | -37 |

FIG. 3

| 8  | 5  | 5  | 8  | 12 | 20 | 25 | 30 |
|----|----|----|----|----|----|----|----|
| 6  | 6  | 7  | 9  | 13 | 29 | 30 | 27 |
| 7  | 6  | 8  | 12 | 20 | 28 | 34 | 28 |
| 7  | 8  | 11 | 14 | 25 | 43 | 40 | 31 |
| 9  | 11 | 18 | 28 | 34 | 54 | 51 | 38 |
| 12 | 17 | 27 | 32 | 40 | 52 | 56 | 46 |
| 24 | 32 | 39 | 43 | 51 | 60 | 60 | 50 |
| 36 | 46 | 47 | 49 | 56 | 50 | 51 | 49 |

FIG. 4

| 13 | 9 | 3 | -1 | 6 | -1 | 1 | -1 |
|---|---|---|---|---|---|---|---|
| -8 | 7 | 8 | -2 | 3 | 3 | -1 | 0 |
| -6 | 2 | 4 | 8 | -1 | -2 | 1 | 2 |
| 2 | 3 | 12 | -2 | -1 | 0 | 0 | 0 |
| -8 | -1 | -5 | 0 | 1 | 0 | -1 | -1 |
| -3 | -2 | 0 | 2 | -2 | 1 | -1 | 0 |
| -1 | 1 | 1 | -1 | 2 | -1 | 0 | -2 |
| 0 | -2 | 0 | 0 | 0 | 1 | -1 | -1 |

FIG. 5

| 13 | 9 | 3 | 0 | 6 | 0 | 0 | 0 |
|----|----|----|----|----|----|----|----|
| -8 | 7 | 8 | 0 | 3 | 3 | 0 | 0 |
| -6 | 0 | 4 | 8 | 0 | 0 | 0 | 0 |
| 0 | 3 | 12 | 0 | 0 | 0 | 0 | 0 |
| -8 | 0 | -5 | 0 | 0 | 0 | 0 | 0 |
| -3 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 7

| 104 | 45 | 15 | 0 | 72 | 0 | 0 | 0 |
|---|---|---|---|---|---|---|---|
| -48 | 42 | 56 | 0 | 39 | 87 | 0 | 0 |
| -42 | 0 | 32 | 96 | 0 | 0 | 0 | 0 |
| 0 | 24 | 132 | 0 | 0 | 0 | 0 | 0 |
| -72 | 0 | -90 | 0 | 0 | 0 | 0 | 0 |
| -36 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 8

IMAGE PROCESSING APPARATUS AND METHOD

CROSS-REFERENCE TO RELATED APPLICATIONS

This application is based upon and claims the benefits of priority from the prior Japanese Patent Application No. 2005-225612, filed on Aug. 3, 2005, the entire contents of which are incorporated herein by reference.

BACKGROUND OF THE INVENTION (1) Field of the Invention

This invention relates to an image processing apparatus and method, and more particularly, to an image processing apparatus and method for compression-encoding image data in the Joint Photographic coding Experts Group (JPEG) format.

(2) Description of the Related Art

JPEG is one of methods for effectively compression-encoding image data.

FIG. 1 shows a configuration of a conventional image processing apparatus which compression-encodes image data in the JPEG format.

The conventional image processing apparatus 50 has a Discrete Cosine Transformation (DCT) unit 51, a quantizer 52, and a Huffman encoder 53. The DCT unit 51 performs DCT. The quantizer 52 quantizes DCT coefficients resulted from the DCT. The Huffman encoder 53 performs compression-encoding with Huffman codes.

In the JPEG standard, an original image is divided into a plurality of 8×8-pixel blocks, and each block is compression-encoded. This block is a basic unit for the JPEG format and is called a Minimum Coded Unit (MCU) hereinafter. The DCT unit 51 performs the DCT on each received MCU to calculate DCT coefficients. The calculated DCT coefficients are quantized by the quantizer 52 using a quantization table 52a. The Huffman encoder 53 receives the quantized DCT coefficients and performs entropy encoding with Huffman codes, thereby creating an encoded signal comprising "1" and "0" codes. This process is performed on all MCUs.

By the way, you may want to adjust the amount of codes (the amount of bits) of image data to be encoded, for example, for storing the image data in a memory medium with a limited capacity for a Digital Still Camera (DSC) or a Digital Video Camera (DVC). To obtain a target amount of bits, different quantization table values (quantization threshold values) are applied to prescribed sub-areas in related art (for example, refer to Japanese Unexamined Patent Publication No. 2003-304402). However, since the JPEG standard allows only one quantization table to be set for each component (luminance, color difference) of each image, this technique is difficult to be put to practical use.

At present, two-pass encoding is employed, in which encoding is performed on all MCUs once, a quantization table is changed based on the amount of bits obtained by the encoding, and then the encoding is performed again. This two-pass encoding technique, however, causes heavy loads and takes time.

SUMMARY OF THE INVENTION

This invention has been made in view of foregoing and intends to provide an image processing apparatus and method which enable controlling the amount of codes of image data through only one-pass encoding, without changing a quantization table.

To accomplish the above object, the present invention provides an image processing apparatus for compression-encoding image data in a JPEG format. This image processing apparatus comprises: a discrete cosine transformation unit for performing discrete cosine transformation on image data of one image for each processing unit area; a quantizer for quantizing transformation coefficients resulted from the discrete cosine transformation, using a quantization table; and a code amount controller for setting a threshold value for the each processing unit area based on a target amount of codes for the one image and an amount of usable codes for unprocessed processing unit areas, and reducing the transformation coefficients quantized, based on the threshold value, in order to adjust an amount of codes to be generated in the each processing unit area.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows an example of DCT coefficients calculated through DCT.

FIG. 4 shows an example of a quantization table.

FIG. 5 shows an example of quantized DCT coefficients.

FIG. 7 shows an example of quantized DCT coefficients changed based on a threshold value.

FIG. 8 shows an example of a dequantization result.

DESCRIPTION OF THE PREFERRED EMBODIMENTS

A preferred embodiment of this invention will be described with reference to the accompanying drawings.

Figure 1:
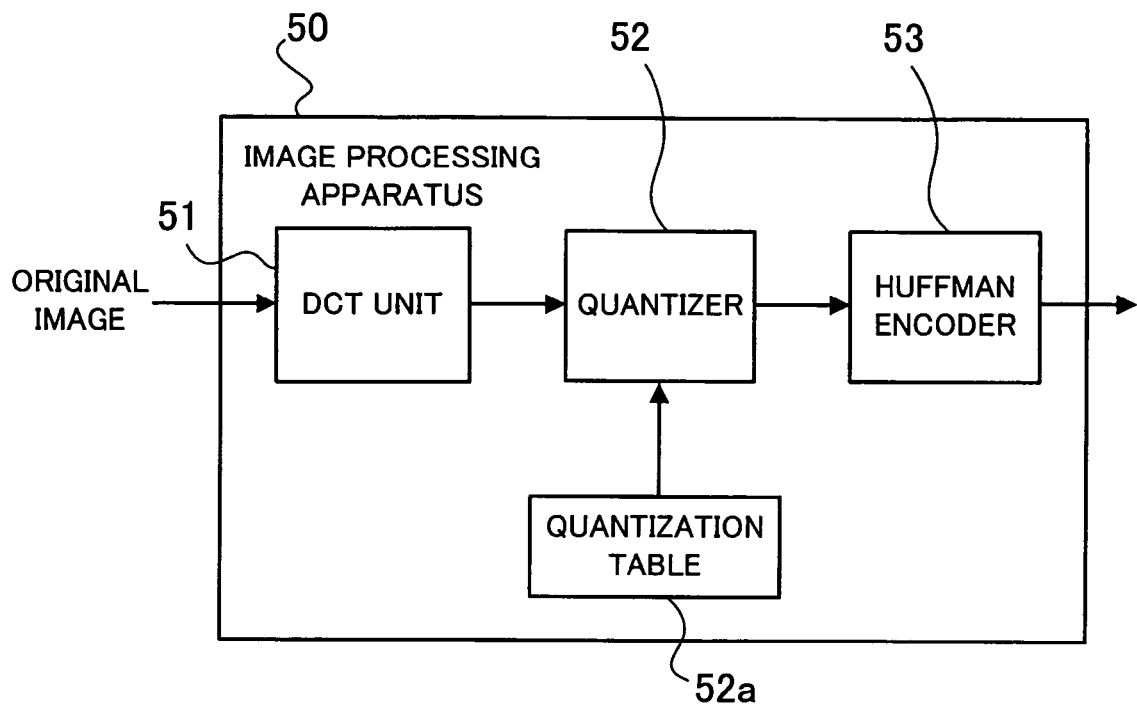
FIG. 1 shows a configuration of a conventional image processing apparatus which compression-encodes image data in the JPEG format.
Figure 2:
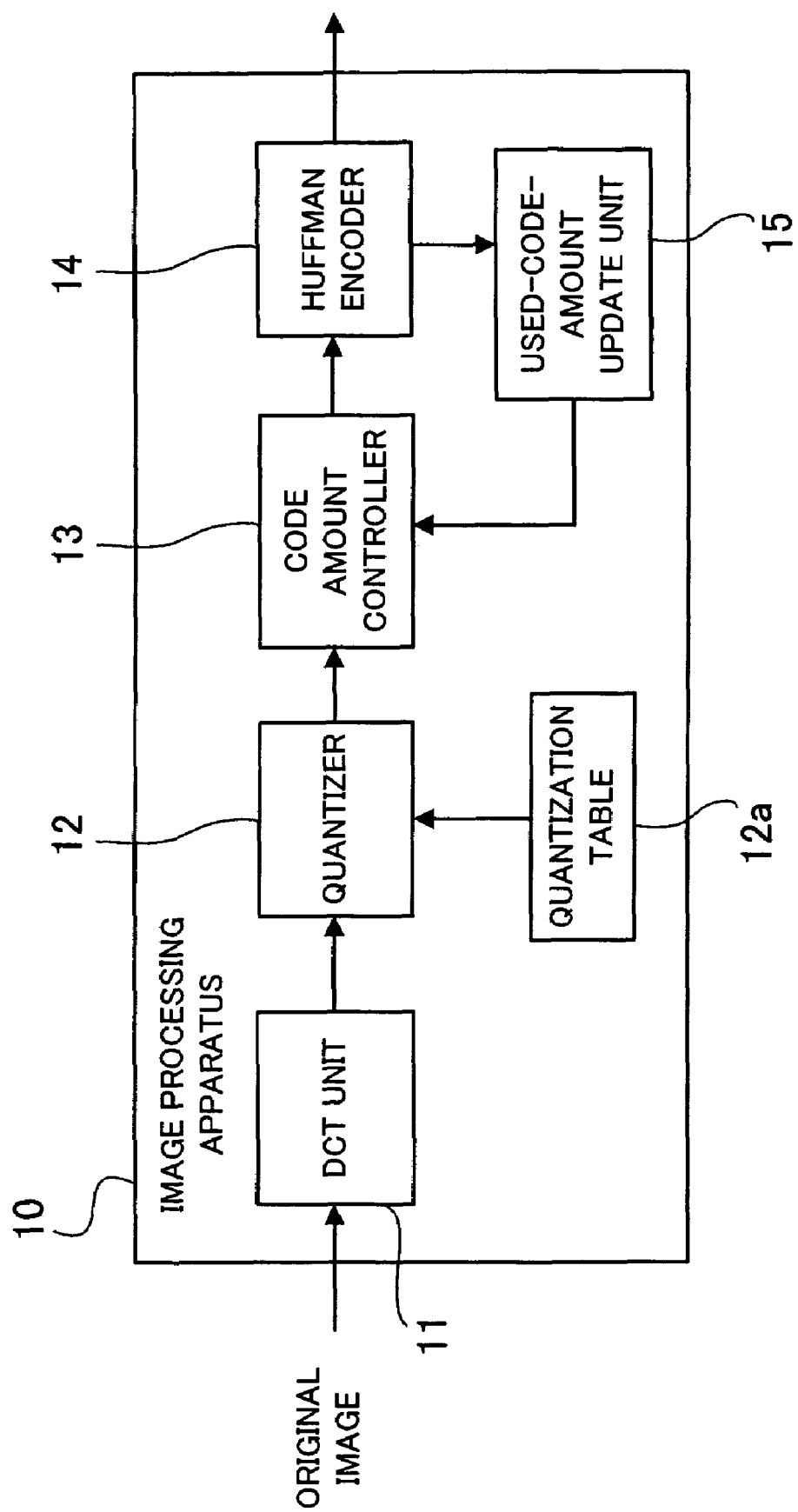
FIG. 2 shows a configuration of an image processing apparatus according to this embodiment.

FIG. 2 shows a configuration of an image processing apparatus according to this embodiment.

This image processing apparatus 10 comprises a DCT unit 11, a quantizer 12, a code amount controller 13, a Huffman encoder 14 and a used-code-amount update unit 15.

The DCT unit 11 performs DCT on the image data of each original image, for each 8×8-pixel MCU, in order to calculate DCT coefficients.

The quantizer 12 quantizes the DCT coefficients resulted from the DCT, using a quantization table 12a.

The code amount controller 13 sets a threshold value based on a target amount of codes (a target amount of bits) for one image and the amount of codes (the amount of bits) usable for the unprocessed MCUs, reduces (zeros) the quantized DCT coefficients based on the threshold value, in order to adjust the amount of bits to be generated in the MCU (this will be described in detail later).

The Huffman encoder 14 receives the quantized DCT coefficients and performs entropy encoding with Huffman codes, thereby creating an encoded signal comprising "1" and "0"

codes, the quantized DCT coefficients reduced (zeroed) based on the threshold value by the code amount controller 13.

The used-code-amount update unit 15 updates the amount of used bits every time when a process of an MCU is completed.

The operation of the image processing apparatus 10 will be now described.

When the image data of original images to be encoded is entered into the image processing apparatus 10, the DCT unit 11 performs the DCT on the image data of each image for each MCU to calculate DCT coefficients.

FIG. 3 shows an example of DCT coefficients calculated through the DCT.

A DCT coefficient representing the level of a frequency component of an original image is calculated for each of pixels (64 pixels) composing an MCU.

Then the quantizer 12 performs the quantization using the quantization table 12a.

FIG. 4 shows an example of the quantization table.

The quantization table 12a contains values (quantization threshold values) for quantizing the 8×8 DCT coefficients of FIG. 3. In the quantization, the DCT coefficients are divided by corresponding quantization threshold values. Since parts with high frequency components (lower-right part of FIG. 3) in an image may be unnoticeable, large quantization threshold values are used.

FIG. 5 shows an example of quantized DCT coefficients.

This figure shows an example of a case where the DCT coefficients of FIG. 3 are quantized using the quantization table 12a of FIG. 4. The quantized DCT coefficients are values obtained by dividing the DCT coefficients by corresponding quantization threshold values. In this connection, number of decimals is rounded off.

Then the code amount controller 13 compares the quantized DCT coefficients with a prescribed threshold value and reduces (zeros) the quantized DCT coefficients that are the threshold value or lower. This changes the run-length and adjusts the amount of bits to be generated by the Huffman encoder 14.

Next is about how to set a threshold value.

A threshold value is set based on a target amount of bits for one image and the amount of bits usable for the remaining unprocessed MCUs. Specifically, the code amount controller 13 receives the amount of used bits updated by the used-code-amount update unit 15, and calculates the amount of bits usable for the unprocessed MCUs, from the amount of used bits and the target amount of bits. For example, when a large amount of bits are usable, a threshold value smaller than that used for the previous MCU is set. When a small amount of bits are usable, a threshold value larger than that used for the previous MCU is set.

A threshold value can be derived from the following expression, for example.

$$B\text{new}=B\text{remain}/MCU\text{remain}$$

$$\text{if } (B\text{new}>B\text{old}+\alpha)\{Q\text{th}=Q\text{old}-Qs\}$$

$$\text{elif } (B\text{new}<B\text{old}-\alpha)\{Q\text{th}=Q\text{old}+Qs\}$$

$$\text{else } \{Q\text{th}=Q\text{old}\} \quad (1)$$

By dividing the amount of bits "Bremain" usable for the unprocessed MCUs by the number of unprocessed MCUs "MCUremain", the amount of bits "Bnew" usable for the MCU being processed is calculated.

When "Bnew" is larger than a value obtained by adding an average amount of bits "Bold" used for the previous MCU and "α", the amount of bits usable is recognized as being sufficient. In this case, a value smaller than the threshold value "Qold" used for the previous MCU by a variation range Qs is used as the threshold value "Qth" which is used for the current MCU.

When "Bnew" is smaller than a value obtained by subtracting "α" from "Bold", the amount of bits usable is recognized as being insufficient. In this case, a value larger than the threshold value "Qold" by a variation range "Qs" is used as the threshold value "Qth".

In the other cases, the amount of bits is recognized as being appropriate, and the threshold value "Qold" is used as the threshold value "Qth".

"α" of the above expression is variation sensitivity for changing a threshold value and gives a range for judging the amount of bits. This prevents a threshold value from changing dynamically and also prevents image quality deterioration. In addition, the variation range "Qs" is adjusted to a prescribed value so as to prevent sudden change of the threshold value and deviation of image quality. The variation sensitivity "α" and the variation range "Qs" may be derived based on the characteristics of an input image, for example.

Figure 6:
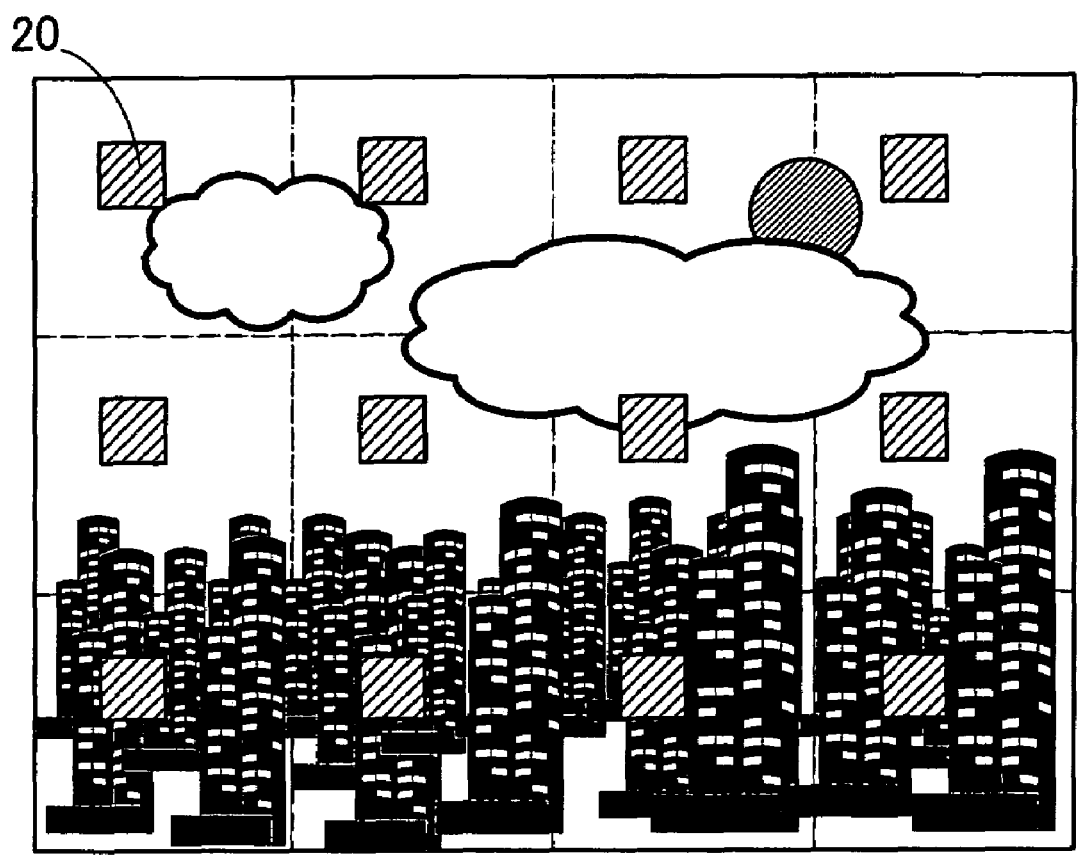
FIG. 6 is a view for explaining differences in the amount of generated codes depending on image characteristics.

FIG. 6 shows a view for explaining differences in the amount of generated bits that are caused depending on the characteristics of an image.

The upper and lower parts of the image have different amounts of generated bits. The intricate lower part has a larger amount of generated bits. Therefore, for each MCU of the upper part of the image, variation sensitivity "α" and a variation range "Qs" are set so as to obtain a large threshold value. For each MCU of the lower part of the image, on the other hand, variation sensitivity "α" and a variation range "Qs" are set so as to obtain a small threshold value. Thereby a larger amount of bits can be assigned to the intricate lower part of the image.

To extract the characteristics of an image, the image should be encoded with a fixed threshold value once. For this purpose, not all MCUs but some MCUs 20 (FIG. 6) thinned out at prescribed intervals may be encoded (thin-encoding) and the amount of generated codes may be checked. In this connection, by storing DCT and quantized values, for the MCUs 20 encoded to extract the characteristics of the image, the same process can be omitted, thus speeding up the encoding process.

Alternatively, the variation sensitivity "α" and the variation range "Qs" may be changed according to the amount of bits used for the processed MCUs.

In the above description, the amount of bits to be assigned is determined based on the unprocessed MCUs, thereby obtaining the target amount of bits. As another way for obtaining the target amount of bits, some MCUs out of the unprocessed MCUs are specified, and an over-or-under amount of bits may be covered by bits to be used for the specified MCUs. This can prevent the over-or-under amount from being covered toward the end.

In addition, although a fixed threshold value is used for the same MCU, a small threshold value may be used for low frequency components of an image and a large threshold value may be used for unnoticeable high frequency components of the image. This technique is equivalent to that of setting small quantization threshold values for low frequency components and large quantization threshold values for high frequency components, using the quantization table 12a.

FIG. 7 shows an example of quantized DCT coefficients changed based on a threshold value.

This figure shows a case of reducing the amount of bits with a threshold value Qth=2 for the quantized DCT coefficients of FIG. 5. As can be recognized, the quantized DCT coefficients of which the absolute values are two or smaller are all zero.

The Huffman encoder 14 performs entropy encoding with Huffman codes by using the quantized DCT coefficients changed as described above, in order to create an encoded signal comprising 1 and 0 codes. In the end of the process of each MCU, the used-code-amount update unit 15 updates the amount of used bits based on the amount of bits used for this time's process of the MCU.

By performing the above process on all MCUs, the JPEG compression-encoded data having a desired target amount of bits can be created through one-pass encoding.

To the JPEG compression-encoded data with the target amount of bits, information required for decoding, such as the used quantization table 12a and header information (image size and color) is added. The created data is recorded in an unshown recording medium or sent to an unshown external device through an unshown external transmission route in a form of bitstream. At the time of decoding, the header information and the quantization table 12a are used to decode the compression-encoded data, as in the case of conventional cases.

FIG. 8 shows a dequantization result.

This figure shows a result of dequantizing the quantized DCT coefficients of FIG. 7, which have been changed based on the threshold value, using the quantization table 12a of FIG. 4. After DCT coefficients are calculated by the dequantization, inverse-DCT is performed to create a decoded image.

By the way, the image processing apparatus 10 according to this embodiment can be applied to Motion JPEG. A process for the Motion JPEG encoding will be now described.

Figure 9:
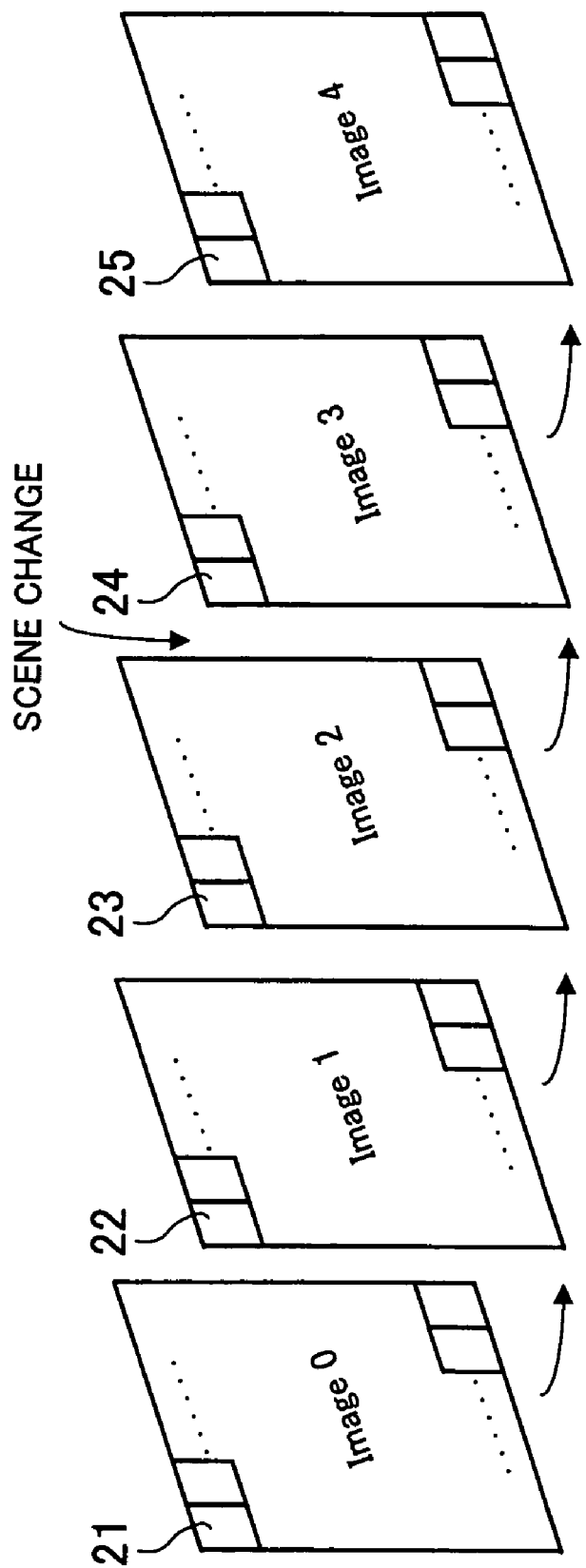
FIG. 9 is a view for explaining Motion JPEG encoding.

FIG. 9 is a view for explaining the Motion JPEG encoding.

The Motion JPEG comprises continuous frame images (Image 0-4) to be compression-encoded in the JPEG format. As to each frame image, encoding is performed on each MCU by the image processing apparatus 10 according to this embodiment as described above. As to "Image 0", for example, starting with an MCU 21, DCT and quantization are performed, and then entropy encoding is performed with Huffman codes based on a prescribed threshold value set by the code amount controller 13. This process is performed on all MCUs 21 of the "Image 0". In this connection, different threshold values which are calculated by the above-described expression (1) are applied to the MCUs 21.

When the same process is performed on the following frame image "Image 1", the code amount controller 13 adjusts the amount of codes by applying an average of threshold values used for the previous frame image "Image 0", to a first MCU 22 of the "Image 1". Similarly, the code amount controller 13 adjusts the amount of codes by applying an average of threshold values used for the previous frame image "Image 1", to a first MCU 23 of the following frame image "Image 2". This technique can improve the image quality of frame images.

When a scene change occurs between the frame images "Image 2" and "Image 3", the code amount controller 13 does not use the average of threshold values used for the previous frame image "Image 2" but sets a threshold value based on a target amount of bits for the "Image 3", for a first MCU 24 of the "Image 3". Then, an average of threshold values used for the "Image 3" is applied to an MCU 25 of the "Image 4".

It should be noted that the values of the quantization table 12a can be changed for each frame image, depending on an average of threshold values used for a previous frame image.

According to this invention, quantized DCT coefficients are reduced based on a threshold value, which is set for each MCU based on a target amount of codes for one image and the amount of codes usable for the unprocessed MCUs, in order to adjust the amount of codes to be generated in the MCU. Therefore, the amount of codes can be controlled for one image through one-pass encoding, without changing a quantization table.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus for compression-encoding image data in a JPEG format, comprising:
    a discrete cosine transformation unit for performing discrete cosine transformation on image data of one image for each processing unit area;
    a quantizer for quantizing transformation coefficients resulted from the discrete cosine transformation, using a quantization table; and
    a code amount controller for setting a threshold value for the each processing unit area based on a target amount of codes for the one image and an amount of usable codes for unprocessed processing unit areas, and reducing the transformation coefficients quantized, based on the threshold value, in order to adjust an amount of codes to be generated in the each processing unit area.

2. The image processing apparatus according to claim 1, wherein the code amount controller increases the threshold value to be used for a current processing unit area being processed when the amount of usable codes for the unprocessed processing unit areas is small in view of the target amount of codes, and decreases the threshold value when the amount of usable codes is large.

3. The image processing apparatus according to claim 2, wherein the code amount controller specifies some unprocessed processing unit areas and covers an over-or-under amount of codes in the some unprocessed processing unit areas specified, to obtain the target amount of codes.

4. The image processing apparatus according to claim 1, wherein the code amount controller adjusts a variation range or variation sensitivity for setting the threshold value.

5. The image processing apparatus according to claim 4, wherein the code amount controller changes the variation range or the variation sensitivity according to characteristics of the image data received.

6. The image processing apparatus according to claim 5, wherein encoding is previously performed on some processing unit areas thinned out at prescribed intervals, with a fixed threshold value, in order to extract the characteristics of the image data.

7. The image processing apparatus according to claim 6, wherein quantized transformation coefficients obtained by the encoding are stored, and the quantized transformation coefficients stored are used when the encoding is performed with the threshold value set based on the variation range or the variation sensitivity.

8. The image processing apparatus according to claim 1, wherein the code amount controller adjusts the threshold value according to frequency components of the image data.

9. The image processing apparatus according to claim 1, wherein the code amount controller applies an average of threshold values used for a previous frame, to a first processing unit area of a following frame, in the image data having continuous Motion JPEG frames.

10. The image processing apparatus according to claim 9, wherein the quantization unit changes the quantization table to be applied to the following frame based on the average of the threshold values used for the previous frame.

11. An image processing method for compression-encoding image data in a JPEG format, comprising:

performing discrete cosine transformation on image data of one image for each processing unit area;

quantizing transformation coefficients resulted from the discrete cosine transformation, using a quantization table;

setting a threshold value for the each processing unit area based on a target amount of codes for the one image and an amount of usable codes for unprocessed processing unit areas; and reducing the transformation coefficients quantized, based on the threshold value, in order to adjust an amount of codes to be generated in the each processing unit area.

12. The image processing method according to claim 11, wherein the image processing method is to be executed by an image processing apparatus, which comprises:

a discrete cosine transformation unit to perform the performing discrete cosine transformation;

a quantizer to perform the quantizing transformation coefficients;

a code amount controller to perform the setting the threshold value and the reducing the transformation coefficients quantized.

* * * * *